United States Patent [19]

Imai et al.

[11] Patent Number: 4,707,510

[45] Date of Patent: Nov. 17, 1987

[54] FLAME RETARDANT RESIN COMPOSITION

[75] Inventors: Tatsuhiko Imai, Izumi; Masuo Kawasawa, Sakai, both of Japan

[73] Assignee: Daicel Chemical Industries, Ltd., Osaka, Japan

[21] Appl. No.: 29,345

[22] Filed: Mar. 20, 1987

Related U.S. Application Data

[63] Continuation of Ser. No. 898,768, Aug. 14, 1986, which is a continuation of Ser. No. 709,003, Mar. 7, 1985, abandoned.

[51] Int. Cl.$^4$ .................................................. C08K 5/06
[52] U.S. Cl. .................................. 524/281; 524/373; 524/412; 524/91; 524/336
[58] Field of Search .................. 524/281, 373, 412, 91, 524/336

[56] References Cited

U.S. PATENT DOCUMENTS

| | | | |
|---|---|---|---|
| 3,855,277 | 12/1974 | Fox | 524/410 |
| 3,876,611 | 4/1975 | Anderson et al. | 524/373 |
| 3,907,744 | 9/1975 | Anderson et al. | 524/373 |
| 4,016,138 | 4/1977 | Anderson et al. | 524/373 |
| 4,016,139 | 4/1977 | Anderson et al. | 524/412 |
| 4,033,932 | 7/1977 | Anderson | 524/373 |
| 4,038,248 | 7/1977 | Anderson | 524/373 |
| 4,041,013 | 8/1977 | Anderson | 524/373 |
| 4,064,105 | 12/1977 | Anderson et al. | 524/373 |
| 4,067,930 | 1/1978 | Versnel et al. | 524/412 |
| 4,301,058 | 11/1981 | Neukerchen et al. | 524/369 |

OTHER PUBLICATIONS

Modern Plastics Encyclopedia, 1971–1972, pp. 650–652.
Tabor et al–Fire Retardants: Proceedings of 1974 Int'l. Symposium on Flammability and Fire Retardants, May 1–2, 1974, Ontario, Canada, pp. 162–179 (1975).

*Primary Examiner*—Veronica P. Hoke
*Attorney, Agent, or Firm*—Flynn, Thiel, Boutell & Tanis

[57] ABSTRACT

A resin composition comprises 100 parts by weight of a thermoplastic resin and 9 to 55 parts by weight of an additive mixture comprising (A) 3 to 35 parts by weight of a tetrahalogenated bisphenol A carbonate oligomer, (B) 3 to 35 parts by weight of bis(tribromo-phenoxy)ethane and (C) 0.5 to 15 parts by weight of antimony trioxide. It is advantageous in respect to flame retardancy, impact resistance and light durability.

20 Claims, 1 Drawing Figure

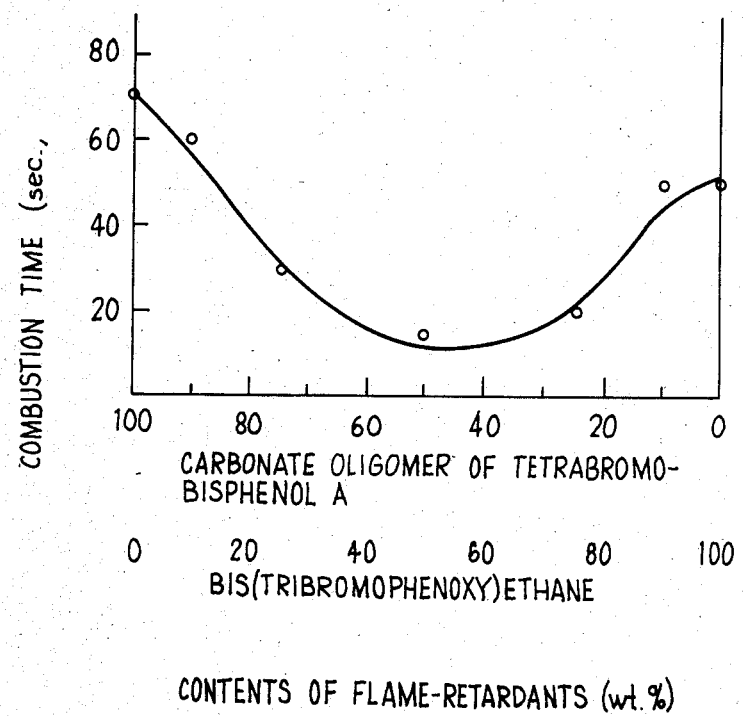

FLAME RETARDANT RESIN COMPOSITION

This application is a continuation of application Ser. No. 898 768, filed Aug. 14, 1986, which is a continuation of application Ser. No. 709 003, filed Mar. 7, 1985 all now abandoned.

The present invention relates to a composition containing a flame-retarded thermoplastic resin, more particularly to a flame-retardant resin composition in which the impact resistance of the thermoplastic resin is not damaged and the light resistance is excellent.

Plastic materials have recently been used in more and more various fields. High-impact polystyrene, ABS resin, or other styrenic thermoplastic resins are used in an extremely wide application as automobile components, electrical appliances, constructional materials, or various molding articles, thanks to their excellent impact resistance and moldability.

Various legal regulations are made, however, as the application of these thermoplastic resins is widened. High flame retardance is demanded for flame-retardant materials. For office automation equipment, which is a most rapidly developing field, not only said flame retardance under regulations but also excellent light resistance are required.

The following two methods of producing flame-retarding thermoplastic resins, which are inherently combustible, are generally employed:

(a) a so-called flame retardant addition method, characterized in that a relatively low-molecular flame retardant containing a large amount of halogen, e.g., a combination of tetrabromobisphenol A (TBBA) and triphenyl phosphate (TPP) (Japanese Patent Publication No. 37106/1976) or a combination of decabromodiphenyl ether and antimony trioxide (Japanese Patent Laid-open No. 187450/1983) is incorporated, and (b) a so-called blending method, characterized in that a halogen-containing high-molecular compound such as polyvinyl chloride (PVC) is blended (Japanese Patent Publication No. 40893/1973).

The compositions in which polyvinyl chloride or other chlorine-containing, flame-retardant compounds are incorporated show a more excellent anti-dripping effect in flame resistance and a higher light resistance than those in which bromine-containing, flame-retardant compounds are incorporated, but their heat stability is so poor that PVC is likely to be pyrolytically decomposed at the molding temperatures of thermoplastic resins, which may often result in the corrosion of molds.

Though the composition in which bromine-containing, flame-retardant compounds are incorporated are less light-resistant than those in which chlorine-containing, flame-retardant compounds are incorporated, thermoplastic resin compositions in which bromine-containing flame retardants are incorporated engross the market at present because of their excellence in heat stability.

There are high-molecular bromine-containing, flame-retardant compounds and low-molecular ones. The compositions in which high-molecular bromine-containing flame retardants are incorporated have improved heat deformation temperatures and excellent heat stability over those in which low-molecular ones are incorporated, but are disadvantageous in largely lowered fluidity, poor moldability, large decrease in impact resistance, and costliness.

The low-molecular bromine-containing flame retardants include (a) high-melting retardants having a melting point of higher than 250° C., which are as excellent in heat stability as the high-molecular type, but disadvantageous in largely deteriorated fluidity, poor moldability, formation of flow marks on the surface of the molded articles, and largely decreased impact resistance, and (b) low-melting retardants having a melting point of lower than 250° C., which are excellent in fluidity, improved in moldability, and not largely deteriorated in impact resistance, but disadvantageous in low heat deformation temperatures and poor heat stability, which limit the molding temperature range of thermoplastic resins.

The thermoplastic resins flame-retarded with the bromine-containing, flame-retardant compounds described above are largely discolored by irradiation with ultraviolet light in sunlight or fluorescent light, and this disadvantage must be put up with by the painting of the molded articles or other methods in practical use. Flame-retardant resin compositions having excellent light resistance have not yet been developed.

The inventors have completed the present invention as the result of intensive studies with the purpose of modifying a combustible thermoplastic resin to obtain a flame-retardant and at the same time light-resistant resin composition, based on the finding that a combustible thermoplastic resin, which has been known to be converted into a light-resistant and flame-retardant resin composition by the incorporation of a combination of a high-molecular type tetrahalogenated bisphenol A carbonate oligomer and antimony trioxide or a combination of a low-molecular type bromine-containing flame retardant and antimony trioxide, can be remarkably flame-retarded and improved in light resistance with an unexpectedly outstanding effect by the incorporation of a combination of a high-molecular halogen-containing flame-retardant/low-molecular bromine-containing flame-retardant mixture and antimony trioxide.

In more detail, the present invention relates to a highly light-resistant, flame-retardant resin composition, characterized in that (A) 3 to 35 parts by weight of a tetrahalogenated, bisphenol A carbonate oligomer, (B) 3 to 35 parts by weight of bis(tribromophenoxy)ethane, and (C) 0.5 to 15 parts by weight of antimony trioxide are incorporated in 100 parts by weight of a thermoplastic resin such that the total amount of (A), (B), and (C) accounts for 9 to 55 parts by weight.

When either the tetrahalogenated bisphenol A carbonate oligomer or bis(tribromophenoxy)ethane is incorporated singly, the flame-retardant effect is lowered, i.e., it takes approximately at least doubled total combustion time, as measured in the combustibility test according to UL-94, when compared with that of the combination of these flame-retardants is incorporated. This complex flame retardant composed of a tetrahalogenated bisphenol A carbonate oligomer and bis(tribromophenoxy)ethane exerts an unexpected synergistic flame retarding effect on thermoplastic resins. The reason has not yet been clarified at present, but the compatibility in chemical structure of the present complex flame retardant with thermoplastic resins is attributable to this effect, i.e., the flame retardance of thermoplastic resins may be improved and the physical and thermal characteristics maintained by the improvement in dispersibility and compatibility of the resin because aromatic rings are contained in both of the compounds which the present complex flame retardant comprises.

Moreover, a combination of said flame-retardant resin composition and a benzophenone or benzotriazole ultraviolet light absorber shows excellent light resistance. The use of this combination protects the resin from discoloration by ultraviolet light, from which conventional flame-retardant compositions, in which bromine-containing flame retardants are incorporated, have suffered.

The thermoplastic resin used in the present invention includes polymers and copolymers of styrene, 60 -methylstyrene, butylstyrene, etc., impact-resistant polystyrene containing coreacting or incorporated elastomers, styrene-acrylonitrile copolymers, acrylonitrile-butadiene-styrene (ABS) graft polymers, acrylonitrile-butadiene-60 -methylstyrene-methacrylate-graft polymers, copolymers of styrene and acrylic or methacrylic acid or an ester thereof, copolymers of maleic anhydride or an ester thereof and styrene, acrylonitrile-styrene-ethylene-propylene tetrapolymer (AES), and the like.

The polymerization can be effected by any of the emulsion, bulk, solution, and suspension polymerization methods.

Any of the compounds containing 2 to 10, preferably 3 to 7 units represented by the general formula:

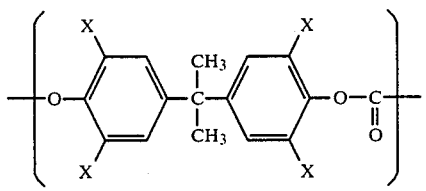

(wherein X stands for bromine or chlorine) can be used as the tetrahalogenated bisphenol A carbonate oligomer (A) of the present invention.

The carbonate oligomer is prepared from 2,2-(4,4'-dihydroxy-3,3',5,5'-tetrahalodiphenyl) propane, i.e., tetrahalogenated bisphenol A, in the ordinary phosgene method, by the chain termination in the presence of an organic monohydroxy compound or other monofunctional compounds, for example, phenol, p-t-butylphenol, or other lower alkylphenol or lower alkylhalophenol. A compound in which 50 % by weight or less, based on the amount of the tetrahalogenated bisphenol A, of a bisphenol A containing no halogens is copolymerized is also included in the tetrahalogenated bisphenol A carbonate oligomer of the present invention.

A carbonate oligomer derived from 2,2-(4,4'- dihydroxy-3,3',5,5'-tetrabromodiphenyl)propene is preferable as the component (A) of the present invention.

The amount of the carbonate oligomer is within the range of 3 to 35 parts by weight, preferably 5 to 30 parts by weight, based on 100 parts by weight of the thermoplastic resin.

The larger the amount of the carbonate oligomer, the higher the flame retardance of the thermoplastic resin of the present invention. If it exceeds 35 parts by weight, however, the fluidity and the impact resistance of the resin composition are largely deteriorated.

The low-molecular bromine-containing flame retardant used as the component (B) of the present invention is bis(tribromophenoxy)ethane. The effect of the present invention cannot be exerted without the use of this flame retardant.

Bis(tribromophenoxy)ethane is incorporated in an amount ranging from 3 to 35 parts by weight, preferably from 5 to 30 parts by weight, based on 100 parts by weight of the thermoplastic resin.

The larger the amount of bis(tribromophenoxy)ethane, the higher the flame retardance of the composition. If the amount exceeds 35 parts by weight, however, the heat resistance of the resin composition is largely deteriorated.

Antimony trioxide, which is the component (C) of the present invention, is an essential component for the efficient preparation of a highly flame-retardant resin composition.

Antimony trioxide is incorporated in an amount ranging from 0.5 to 15 parts by weight, preferably from 5 to 13 parts by weight, based on 100 parts by weight of the thermoplastic resin.

Antimony trioxide serves as flame-retardant auxiliary for halogen-containing organic compounds. It must be present in an amount ranging from 1/6 to 178 , preferably from 1/5 to 1/2.5 of the halogen-containing organic compound.

The thermoplastic resin composition of the present invention can be endowed with high flame retardance by incorporating 9 to 55 parts by weight in total of a high-molecular halogen-containing flame retardant as the component (A), a low-molecular bromine-containing flame retardant as the component (B), and antimony trioxide as the component (C) in 100 parts by weight of the thermoplastic resin. If the total amount of the components (A), (B), and (C) exceeds 55 parts by weight, the impact resistance is extremely deteriorated, though the high flame retardance is maintained. Satisfactory flame retardance cannot be obtained if the amount is smaller than 9 parts by weight. Unless a combination of a high-molecular halogen-containing flame retardant as the component (A) and a low-molecular bromine-containing flame retardant as the component (B), i.e., a complex flame retardant composed of (A) a tetrahalogenated bisphenol A carbonate oligomer and (B) bis(tribromophenoxy)ethane is used, the amounts of said two flame retardants cannot be reduced. Moreover, the physical properties of the resin composition is deteriorated, the process is economically disadvantageous, and no sufficient light resistance can be expected without the use of the present complex flame retardant. The incorporation ratio of the component (A) to the component (B) is preferred to be within the range of 25/75 to 75/25 (weight ratio).

The benzophenone or benzotriazole ultraviolet light absorber used in the present invention includes 2-hydroxy-4-methoxybenzophenone, 2,4-dihydroxybenzophenone, 2,2'-dihydroxy-4-methoxybenzophenone, 2-(2'-hydroxy-5'-methylphenyl)-benzotriazole, 2-(2'-hydroxy-340 -t-tubyl-5'-methylphenyl)-5-chlorobenzotriazole, 2-(2'-hydroxy-3',5'-t-butylphenyl)-5-chlorobenzotriazole, and the like.

Said ultraviolet light absorber is incorporated in an amount ranging from 0.01 to 5 parts by weight, preferably from 0.05 to 3 parts by weight, in 100 parts by weight in total of the thermoplastic resin and the components (A), (B), and (C).

Besides the above four components, ordinarily used additives, for example, heat stabilizers, anti-oxidants, lubricants, or coloring agents may optionally be incorporated.

A mixture of the thermoplastic resin, (A) the tetrahalogenated bisphenol A carbonate oligomer, (B) bis(tribromophenoxy)ethane, (C) antimony trioxide, and the ultraviolet light absorber of the present invention can be prepared easily with a conventional device such as a heated roll, a Banbury mixer, or an extruder, without specified means or order.

BRIEF DESCRIPTION OF THE DRAWING

The drawing illustrates the relationship between the proportion (wt %) of the tetrabromobisphenol A carbonate oligomer/bis(tribromophenoxy)ethane complex flame retardant and the combustion time measured by the UL-94, 1/16" combustion test.

The present invention will now be described in more detail by the following examples and comparative examples, in which the ratios of incorporation are all represented by parts by weight.

In the following examples, the combustibility was tested according to the Subject 94, regulated by Underwriters' Laboratories (referred to as UL-94) in U.S.A.

The specimens, which were 5 inches long, ½ inch wide, and 1/16 inch thick, were classified into four groups according to their grades of flame resistance, i.e., BN (Burning), 94V-2, 94V-1, and 94V-0. The combustion time was represented by the total combustion time of the five specimens.

The heat deformation temperatures were determined by the testing method according to ASTM D-648 (load: 18.56 kg/cm$^2$), the Izod impact strength according to ASTM D-256 (¼" in width, with a notch, at 23° C.) and the melt flow rate according to ASTM D-1238 (230° C.; load: 5 kg).

The light resistance was measured according to the testing method of JIS K 7102, by measuring changes in color tone of the samples after the test with a color difference meter manufactured by Nihon Denshoku and calculating the color difference ($\Delta E$) by the L, a, b method.. The larger values of $\Delta E$ show the greater discoloration. When the $\Delta E$ value exceeds 12, the changes in color tone become appreciable with regard to the visual sensation.

EXAMPLES 1 TO 5 AND COMPARATIVE EXAMPLES 1 AND 2

ABS resin, a tetrabromobisphenol A carbonate oligomer (n=3), bis(tribromophenoxy)ethane, and antimony trioxide were blended according to the formulations shown in Table 1, and pelletized in an extruder having a cylinder temperature of 230° C. to form thermoplastic resin compositions. Specimens were prepared from the compositions with a jet molder having a cylinder temperature of 230° C. The results of evaluating these compositions are shown in Table 1. The relationship between the proportion (wt %) of a tetrabromobisphenol A carbonate oligomer/bis(tribromophenoxy)ethane complex flame retardant incorporated in the resin composition and the combustion time measured by the UL-94, 1/16" combustion test is illustrated in the drawing.

As understood from Table 1 and the drawing, the thermoplastic resin composition of the present invention, in which a tetrabromobisphenol A carbonate oligomer and bis(tribromophenoxy)ethane are used in combination, shows an outstandingly shortened combustion time and an unexpectedly remarkable effect with the formulation ratios ranging from 75/25 to 25/75. The examples show that the thermoplastic resin compositions of the present invention have excellent fluidity, impact resistance, heat deformation temperature, and light resistance.

It may be understood from Comparative Examples 1 and 2, in which only one of the flame retardants is used in place of the combination of the carbonate oligomer and bis(tribromophenoxy)ethane used in Example 3, that the compositions containing only one of the flame retardants are disadvantageous for practical use not only becuase of their prolonged combustion time but because of the unbalanced characteristics of fluidity, impact resistance, and heat deformation temperature, as compared with those containing a complex flame retardant.

TABLE 1

|  | Conditions | Ex. 1 | Ex. 2 | Ex. 3 | Ex. 4 | Ex. 5 | Comp. Ex. 1 | Comp. Ex. 2 |
| --- | --- | --- | --- | --- | --- | --- | --- | --- |
| ABS | parts | 100 | 100 | 100 | 100 | 100 | 100 | 100 |
| antimony trioxide | parts | 7 | 7 | 7 | 7 | 7 | 7 | 7 |
| tetrabromobisphenol A carbonate oligomer | parts | 30 | 26 | 17.5 | 9 | 5 | 35 | — |
| bis(tribromophenoxy)ethane | parts | 5 | 9 | 17.5 | 26 | 30 | — | 35 |
| UL-94 combustion time (sec) | 1/16" | 60 | 30 | 15 | 20 | 50 | 70 | 50 |
| flame resistance class | 1/16" | 94V-1 | 94V-0 | 94V-0 | 94V-0 | 94V-0 | 94V-1 | 94V-0 |
| heat deformation temperature °C. | FS = 18.56 kg/cm$^2$ | 99 | 96 | 89 | 86 | 81 | 100 | 78 |
| Izod impact strength, kg-cm/cm | with a notch | 10 | 13 | 15 | 17 | 17 | 5 | 18 |
| melt flow rate, g/10 min | 230° C., 5 kg | 12 | 13 | 18 | 21 | 24 | 8 | 25 |
| light resistance, $\Delta E$ (fadeometer) | 50$^{HRS}$ | 10 | 9 | 8 | 8 | 7 | 11 | 7 |
|  | 100$^{HRS}$ | 16 | 16 | 15 | 15 | 14 | 17 | 14 |

EXAMPLES 6 AND 7 AND COMPARATIVE EXAMPLES 3 TO 8

The results of the test in which smaller amounts in total of the bromine-containing flame retardants used in Example 3 were incorporated are shown in Table 2, Examples 6 and 7.

It is evident from the results that the composition of the present invention is excellent in flame retardance, impact resistance, fluidity, heat decomposition temperature, and light resistance.

In Comparative Examples 3 and 4, instead of the combination of the tetrabromobisphenol A carbonate oligomer and bis(tribromophenoxy)ethane used in Example 7, only one of them was incorporated. The results show that the obtained products are disadvantageous for practical use because of not only deteriorated flame retardance but also the unbalance in other characteristics.

In Comparative Examples 5 and 6, a low-molecular bromine-containing flame retardant, i.e., tetrabromobisphenol A or decabromodiphenyl ether, was used instead of the bromine-containing flame retardant used in Comparative Example 4. The obtained products were disadvantageous for practical use because of the unbalance in flame retardance, impact resistance, fluidity, heat deformation temperature, light resistance, and other characteristics, as compared with the one obtained in Example 7.

In Comparative Examples 7 and 8, instead of the low-molecular bromine-containing flame retardant used in Example 7, i.e., bis(tribromophenoxy)ethane, the flame retardant of the same series, i.e., bis(pentabromophenoxy)ethane or tetrabromobisphenol A, was incorporated. The obtained products were disadvantageous compositions manufactured by other companies. They are a little superior to the compositions of the present invention obtained in Example 14 in light resistance because their flame-retardant component consists of chlorine-containing polymers, but disadvantageous in the unbalance in heat deformation temperature, fluidity, and other characteristics and the poor moldability, which makes the molding within the range of the molding temperatures of thermoplastic resins difficult.

TABLE 3

|  | Ex. 8 | Ex. 9 | Ex. 10 | Ex. 11 | Ex. 12 | Ex. 13 | Ex. 14 | Ex. 15 | Comp. Ex. 9 | Comp. Ex. 10 |
|---|---|---|---|---|---|---|---|---|---|---|
| composition of Example 3 | 100 | 100 | 100 | 100 | 100 | 100 | 100 | 100 |  |  |
| 2,4-dihydroxybenzophenone | 1 |  |  |  |  |  |  |  |  |  |
| 2-hydroxy-4-methoxybenzophenone |  | 1 |  |  |  |  |  |  |  |  |
| 2,2'-dihydroxy-4-methoxybenzophenone |  |  | 1 |  |  |  |  |  |  |  |
| 2-(2'-hydroxy-5'-methylphenyl)benzotriazole |  |  |  | 1 |  |  |  |  |  |  |
| 2-(2'-hydroxy-3'-t-butyl-5'-methylphenyl)-5-chlorobenzotriazole |  |  |  |  | 1 |  | 0.5 | 3 |  |  |
| 2-(2'-hydroxy-3',5'-t-butylphenyl)-5-chlorobenzotriazole |  |  |  |  |  | 1 |  |  |  |  |
| ACS manufactured by other company |  |  |  |  |  |  |  |  | 100 |  |
| ABS/PVC manufactured by other company |  |  |  |  |  |  |  |  |  | 100 |
| light resistance $\Delta E$ $50^{HRS}$ | 5 | 5 | 3 | 3 | 2 | 2 | 2 | 2 | 0.5 | 0.5 |
| (fadeometer) $100^{HRS}$ | 7 | 7 | 3 | 3 | 2.5 | 2.5 | 3 | 2 | 2.5 | 3.5 |
| heat deformation temperature, °C. | 89 | 89 | 89 | 89 | 89 | 89 | 89 | 88 | 81 | 75 |
| Izod impact strength, kg-cm/cm | 15 | 15 | 15 | 15 | 15 | 15 | 15 | 15 | 8 | 12 |
| melt flow rate, g/10 min | 18 | 18 | 18 | 18 | 18 | 18 | 18 | 19 | 7 | 7 |
| UL-94, 1/16", flame resistance class | 94V-0 | 94V-0 | 94V-0 | 94V-0 | 94V-0 | 94V-0 | 94V-0 | 94V-0 | 94V-0 | 94V-0 | for practical use because of the deteriorated flame retardance and unbalance in impact and light resistances.

The embodiments of the invention in which an exclusive property of privilege is claimed are defined as follows:

TABLE 2

|  | Conditions | Ex. 6 | Ex. 7 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| ABS resin | parts | 100 | 100 | 100 | 100 | 100 | 100 | 100 | 100 |
| antimony trioxide | parts | 7 | 7 | 7 | 7 | 7 | 7 | 7 | 7 |
| tetrabromobisphenol A carbonate oligomer | parts | 15 | 12.5 | 25 | — | — | — | 12.5 | 12.5 |
| bis(tribromophenoxy)ethane | parts | 15 | 12.5 | — | 25 | — | — | — | — |
| bis(pentabromophenoxy)ethane | parts | — | — | — | — | — | — | 12.5 | — |
| tetrabromobisphenol A | parts | — | — | — | — | 25 | — | — | 12.5 |
| decabromodiphenyl ether | parts | — | — | — | — | — | 25 | — | — |
| UL-94 combustion time (sec) | 1/16" | 25 | 35 | >250 | 70 | >250 | 50 | 150 | >250 |
| flame resistance class | 1/16" | 94V-0 | 94V-0 | BN | 94V-1 | BN | 94V-0 | 94V-1 | BN |
| heat deformation temperature, °C. | FS = 18.56 kg/cm² | 89 | 89 | 96 | 80 | 80 | 91 | 91 | 89 |
| Izod impact strength, kg-cm/cm | with a notch | 16 | 18 | 6 | 23 | 10 | 10 | 6 | 8 |
| melt flow rate, g/10 min | 230° C., 5 kg | 18 | 18 | 10 | 20 | 20 | 4 | 1 | 18 |
| light resistance $\Delta E$ | $50^{HRS}$ | 8 | 8 | 11 | 7 | 15 | 40 | 14 | 14 |
| (fadeometer) | $100^{HRS}$ | 15 | 15 | 17 | 14 | 30 | 50 | 20 | 30 |

EXAMPLES 8 TO 15 AND COMPARATIVE EXAMPLES 9 TO 10

A benzophenone or benzotriazole ultraviolet light absorber was added to the formulation of Example 3. The results are shown in Table 3, Examples 8 to 15. As understood from the table, the compositions obtained in these examples are excellent in light resistance, and still well balanced in various characteristics as shown in Example 3.

Comparative Examples 9 and 10 show the results concerning the ACS and ABS/PVC flame-retardant 1. A resin composition which comprises 100 parts by weight of a normally flammable thermoplastic resin selected from the group consisting of impact-resistant polystyrenes containing an elastomer, styrene-acrylonitrile copolymers, acrylonitrile-butadiene-styrene graft polymers, acrylonitrile-butadiene-α-methyl styrene-methacrylate graft polymers, copolymers of styrene and acrylic acid, methacrylic acid or esters thereof, copolymers of styrene and maleic anhydride or ester thereof and acrylonitrile-styrene-ethylenepropylene tetrapolymers and 9 to 55 parts by weight of an additive mixture consisting essentially of (A) 3 to 35 parts by weight of a tetrahalogenated bisphenol A carbonate oligomer, (B) 3 to 35 parts by weight of bis(tribromophenoxy)ethane and (C) 0.5 to 15 parts by weight of antimony trioxide, wherein the ratio of component (A) to component (B) is from 25:75 to 75:25 by weight.

2. A resin composition as claimed in claim 1 in which said thermoplastic resin is an acrylonitrite-butadiene-styrene resin.

3. A resin composition as claimed in claim 2 in which the ratio of component (A) to component (B) is about 50:50 by weight.

4. A resin composition as claimed in claim 1 in which the weight ratio of (C)/(A) plus (B) is from 1/6 to ½.

5. A resin composition as claimed in claim 1 in which said thermoplastic resin is a styrene resin.

6. A resin composition as claimed in claim 1 in which said thermoplastic resin is an impact-resistant polystyrene containing an elastomer.

7. A resin composition as claimed in claim 6 in which the ratio of component (A) to component (B) is about 50:50 by weight.

8. A resin composition as claimed in claim 1 in which said thermoplastic resin is a styrene-acrylonitrile copolymer.

9. A resin composition as claimed in claim 8 in which the ratio of component (A) to component (B) is about 50:50 by weight.

10. A resin composition as claimed in claim 1 in which said thermoplastic resin is an acrylonitrile-butadiene-α-methylstyrene-methacrylate graft polymer.

11. A resin composition as claimed in claim 1 in which said thermoplastic resin is a copolymer of styrene and acrylic or methacrylic acid or an ester thereof.

12. A resin composition as claimed in claim 1 in which said thermoplastic resin is a copolymer of styrene and maleic anhydride or an ester thereof.

13. A resin composition as claimed in claim 1 in which said thermoplastic resin is an acrylonitrile-styrene-ethylene-propylene tetrapolymer.

14. A resin composition as claimed in claim 13 in which the ratio of compoent (A) to component (B) is about 50:50 by weight.

15. A resin composition which comprises (I) 100 parts by weight of a normally flammable thermoplastic resin selected from the group consisting of impact-resistant polystyrenes containing an elastomer, styrene-acrylonitrile copolymers, acrylonitrile-butadiene-styrene graft polymers, acrylonitrile-butadiene-α-methyl styrene-methacrylate graft polymers, copolymers of styrene and acrylic acid, methacrylic acid or esters thereof, copolymers of styrene and maleic anhydride or ester thereof and acrylonitrile-styrene-ethylenepropylene tetrapolymers, (II) 9 to 55 parts by weight of an additive mixture consisting essentially of (A) 3 to 35 parts by weight of a tetrahalogenated bisphenol A carbonate oligomer, (B) 3 to 35 parts by weight of bis(tribromophenoxy)ethane and (C) 0.5 to 15 parts by weight of antimony trioxide, wherein the ratio of component (A) to component (B) is from 25:75 to 75:25 by weight, and (III) 0.01 to 5 parts, per 100 parts by weight of the sum of (I) plus (II), of a benzophenone or benzotriazole ultraviolet light absorber.

16. A resin composition as claimed in claim 15 in which said thermoplastic resin is an acrylonitrile-butadiene-styrene resin.

17. A resin composition as claimed in claim 16 in which the ratio of component (A) to component (B) is about 50:50 by weight.

18. A resin composition which comprises 100 parts by weight of a normally flammable thermoplastic resin selected from the group consisting of impact-resistant polystyrenes containing an elastomer, styrene-acrylonitrile copolymers, acrylonitrile-butadiene-styrene graft polymers, acrylonitrile-butadiene-α-methylstyrene-methacrylate graft polymers, copolymers of styrene and acrylic acid, methacrylic acid or esters thereof, copolymers of styrene and maleic anhydride or ester thereof and acrylonitrile-styrene-ethylenepropylene tetrapolymers and 9 to 55 parts by weight of an additive mixture consisting essentially of (A) 5 to 30 parts by weight of a tetrahalogenated bisphenol A carbonate oligomer, (B) 5 to 30 parts by weight of bis(tribromophenoxy)ethane and (C) 5 to 13 parts by weight of antimony trioxide, wherein the ratio of component (A) to component (B) is from 25:75 to 75:25 by weight.

19. A resin composition as claimed in claim 18 in which said thermoplastic resin is an acrylonitrile-butadiene-styrene resin.

20. A resin composition as claimed in claim 19 in which the ratio of component (A) to component (B) is about 50:50 by weight.

* * * * *